(12) United States Patent  
Lee et al.

(10) Patent No.: US 6,744,622 B2
(45) Date of Patent: Jun. 1, 2004

(54) SLIDABLE COVER MECHANISM FOR MAIN UNIT

(76) Inventors: Kun-Ho Lee, No. 188, Wen Hwa 2$^{nd}$ Rd., Kuei Shan Hsiang, Taoyuan Hsien (TW); I-Hao Chen, No. 188, Wen Hwa 2$^{nd}$ Rd., Kuei Shan Hsiang, Taoyuan Hsien (TW); Wei-Min Wu, No. 188, Wen Hwa 2$^{nd}$ Rd., Kuei Shan Hsiang, Taoyuan Hsien (TW); Min-Hsiung Ko, No. 188, Wen Hwa 2$^{nd}$ Rd., Kuei Shan Hsiang, Taoyuan Hsien (TW)

( * ) Notice: Subject to any disclaimer, the term of this patent is extended or adjusted under 35 U.S.C. 154(b) by 0 days.

(21) Appl. No.: 10/262,800

(22) Filed: Oct. 2, 2002

(65) Prior Publication Data

US 2004/0027795 A1 Feb. 12, 2004

(30) Foreign Application Priority Data

Aug. 13, 2002 (TW) ........................................ 91118221 A

(51) Int. Cl.$^7$ ................................................. G06F 1/16
(52) U.S. Cl. ........................ 361/680; 361/681; 361/683; 361/684; 312/223.1; 312/223.2; 400/692
(58) Field of Search .................................. 361/680–683, 361/684–686; 312/223.1, 223.2; 400/691–693

(56) References Cited

U.S. PATENT DOCUMENTS

| 6,480,373 | B1 | * | 11/2002 | Landry et al. | ............... | 361/680 |
| 2002/0044408 | A1 | * | 4/2002 | DeLuga et al. | ............. | 361/680 |
| 2002/0085343 | A1 | * | 7/2002 | Wu et al. | .................... | 361/683 |
| 2003/0048605 | A1 | * | 3/2003 | Kyozuka et al. | ............ | 361/686 |

* cited by examiner

Primary Examiner—Darren Schuberg
Assistant Examiner—Anthony Q. Edwards

(57) ABSTRACT

A slidable cover mechanism for a notebook computer's main unit is disclosed, wherein the cover can be separated from the main unit by the method of sliding. The cover mechanism comprises: a top housing, a cover metal plate and housing fixing elements, wherein there are a plurality of components installed between the top housing and the cover metal plate. The top housing has a plurality of fixing holes through which the cover can be combined with the bottom case portion of the main unit. The top housing comprises: sliding hooks and clipping hooks, used for engaging with hinge support elements; a plurality of inserting elements, used for insetting with a plurality of grooves located on the bottom case portion; and a plurality of protrusions, used for inserting into the bottom housing of the bottom case portion.

18 Claims, 15 Drawing Sheets

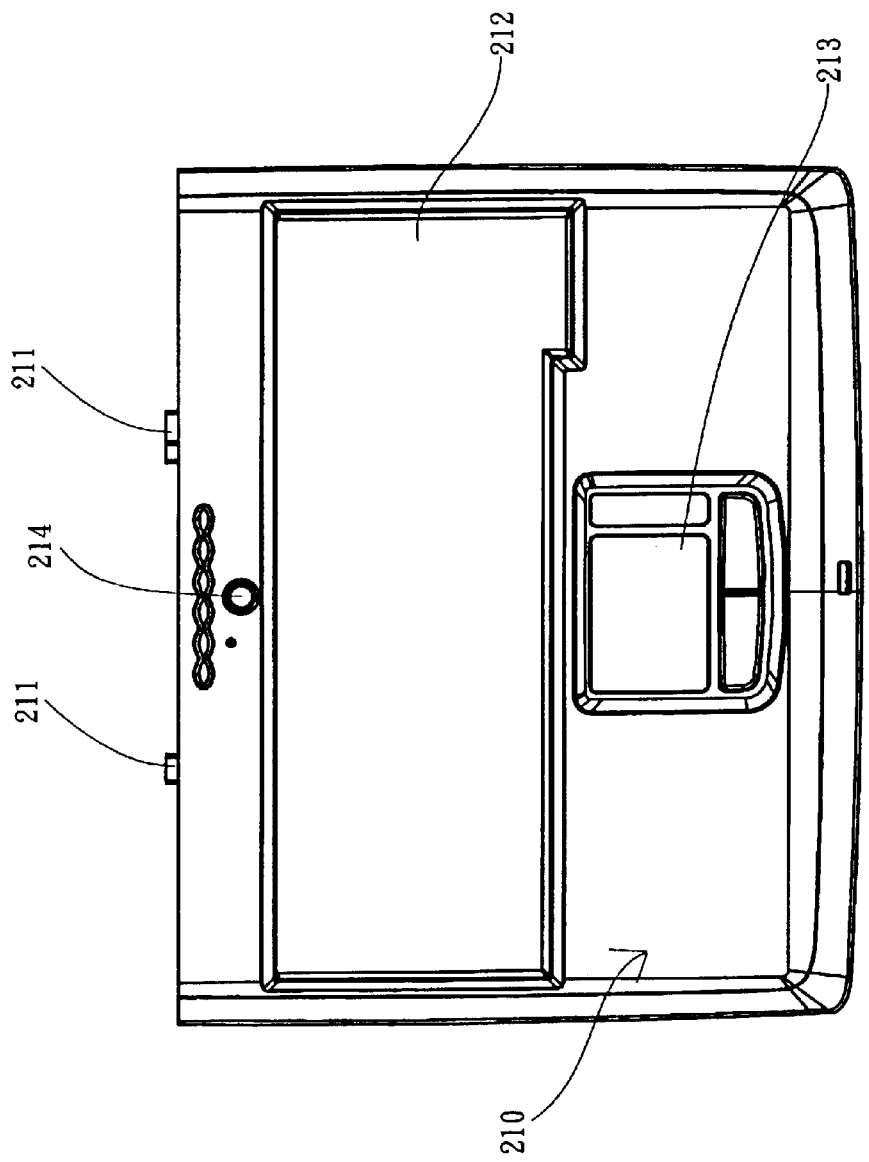

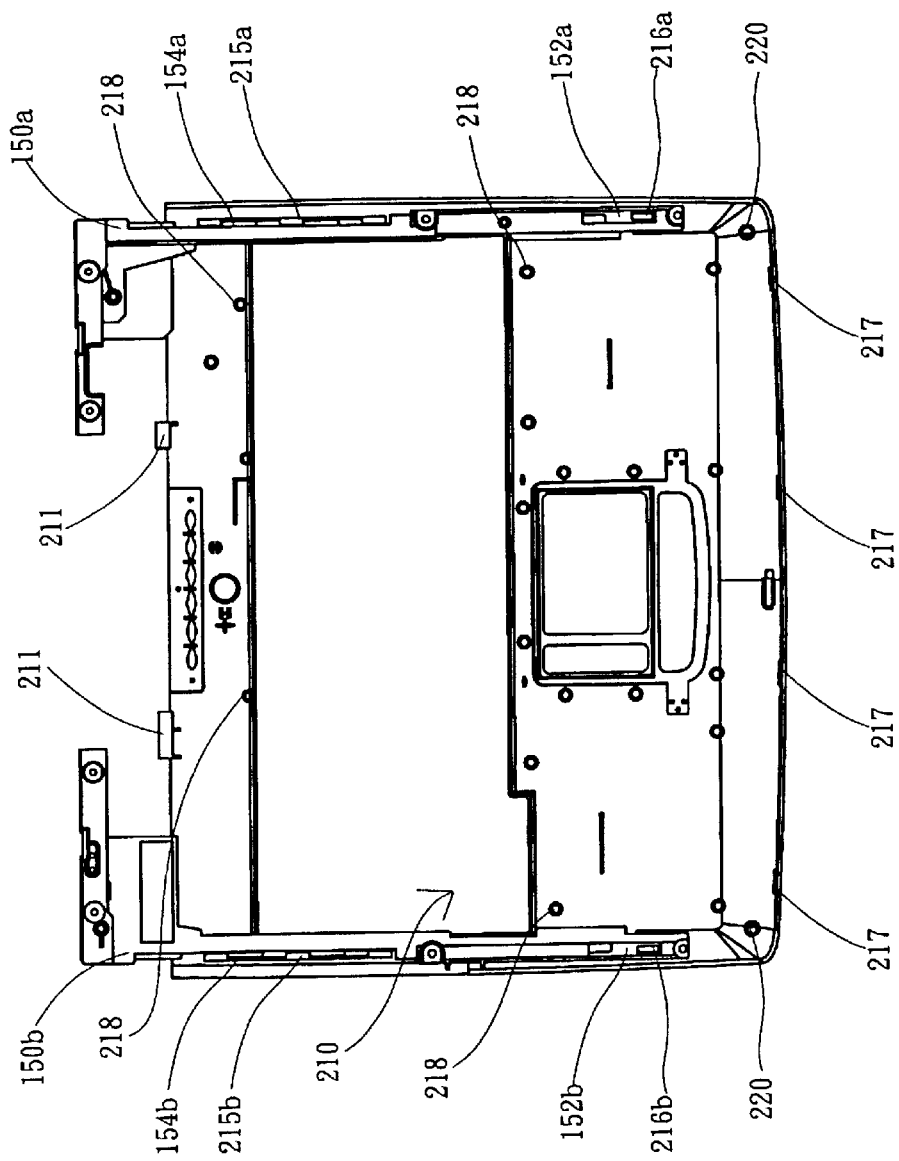

SLIDABLE COVER MECHANISM FOR MAIN UNIT

FIELD OF THE INVENTION

The present invention relates to a slidable cover mechanism for a main unit, and more particularly, to a cover mechanism that can be separated from a notebook computer's main unit by sliding.

BACKGROUND OF THE INVENTION

With the rapidly and continuously new development of various components, and additionally with maintenance needs, users of notebook computer frequently need to dismantle the cover of the notebook computer's main unit for replacing, maintaining or upgrading various important components, such as CPU (Central Processing Unit), thermal module, VGA card, hard disk drive, keyboard or touch pad, etc.

However, for the consideration of structure and EMI (Electromagnetic Interference), the mechanism designs of conventional notebook computers always combine the cover and bottom case of the main unit tightly, and also utilize screws for further fastening, so that the steps of detaching the cover and the bottom case for the main unit are quite complicated and not easy. It is easy for the common users to dismantle a keyboard, while it is very difficult for the users to completely detach the cover from the main unit. It often needs to rely on technical experts to dismantle the cover smoothly. Therefore, not only users have a lot of troubles and inconvenience for maintaining and upgrading notebook computers, but also manufactures and dealers have difficulty in assembling or flexibly replacing the desired components in accordance with the order requirements, thus causing the delay of product delivery and the inconvenience of product maintenance. Moreover, the aforementioned shortcomings are unfavorable for DIY (Do It Yourself) marketing mode to be adopted in the field of notebook computer.

Hence, there is a need to develop a slidable cover mechanism for the notebook computer's main unit for completely drawing out the entire cover of the main unit by sliding, whereby users may finishing assembling and dismantling the notebook computers easily. Meanwhile, the slidable cover mechanism of the notebook computer's main unit also has to be able to form excellent EMI shielding areas.

SUMMARY OF THE INVENTION

In view of the aforementioned background, in the mechanism designs of conventional notebook computers, steps of separating the cover and the bottom case of the main unit are quite complicated and not easy, not only causing users a lot of troubling in maintaining or upgrading notebook computers, but also making manufactures and dealers fail to have prompt product delivery and convenient product maintenance, further being unfavorable for the DIY marketing mode to be adopted in the field of notebook computer.

Hence, it is a main object of the present invention to provide a slidable cover mechanism for a notebook computer's main unit, wherein the cover can be completely drawn out of the main unit, thereby enabling a user to finish assembling and dismantling a notebook computer.

Further, the slidable cover mechanism for the notebook computer's main unit must be able to form excellent EMI shielding areas.

According to the aforementioned objects, the present invention provides a slidable cover mechanism for a notebook computer's main unit, wherein the cover is combined with a bottom case portion of the main unit; the bottom case portion have a bottom housing, a plurality of grooves and a plurality of first fixing holes; and the cover mechanism comprises: a top housing; a cover plate component; and a plurality of housing fixing holes. The top housing comprises: a plurality of second fixing holes; two sliding hooks located on both sides of the top housing for respectively engaging with two hinge support elements, wherein the two hinge support elements are installed on the bottom case portion of the main unit, and are connected to a display module; two clipping hooks located on one side of each sliding hook for respectively engaging with the openings of the hinge support elements; a plurality of tenons located on one side adjacent to the clipping hooks for insetting in the grooves of the bottom case portion of the main unit; a plurality of first fastening holes; and a plurality of protrusion elements located on one side adjacent to the display module for extending into the bottom housing of the bottom case portion of the main unit. The cover plate component has a plurality of second fastening holes, so as to be combined with the top housing via the first fastening holes and the second fastening holes. The housing fixing elements are used to combine the bottom case portion of the main unit with the top housing via the first fixing holes and the second fixing holes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1A to FIG. 1F are schematic diagrams showing the steps of separating a slidable cover mechanism for a notebook computer's main unit, according to the present invention, wherein FIG. 1E is a schematic diagram showing the cover detached from the main unit, and FIG. 1F is a schematic diagram showing the rest portions of the notebook computer after detachment;

FIG. 2A is a schematic top view of the slidable cover mechanism for the notebook computer's main unit, according to the present invention;

FIG. 3A is a schematic bottom view showing the relationship between the top housing and the hinge support elements, according to the present invention, wherein the top housing and the hinge support elements are separated;

FIG. 4A and FIG. 4B are schematic diagrams showing the locations of the contact points between the cover plate component and other components in the bottom case portion, according to the present invention, wherein FIG. 4B illustrates the bottom case portion of the main unit after the cover plate component is removed.

DETAILED DESCRIPTION OF THE PREFERRED EMBODIMENT

Figure 1A:
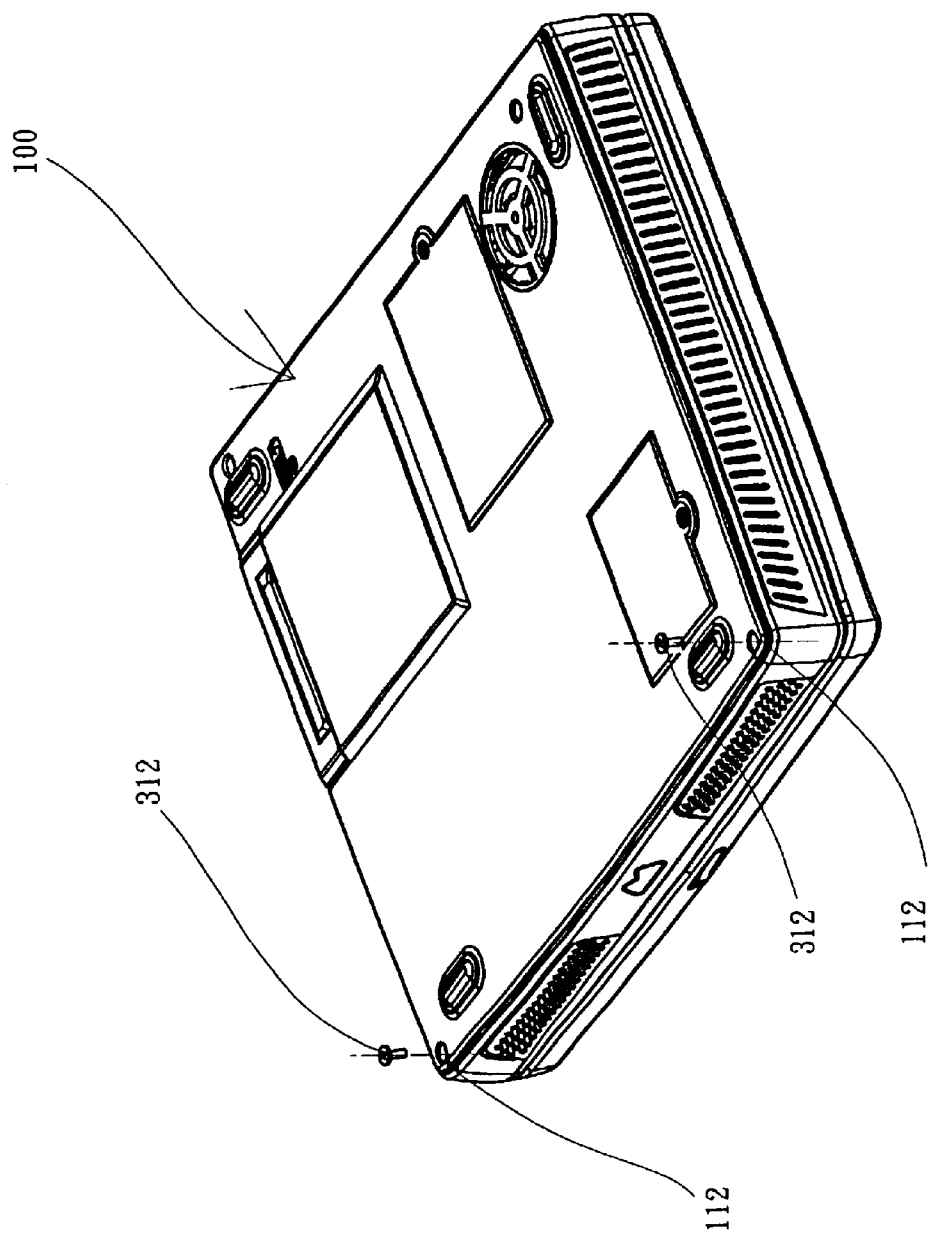
Figure 1B:
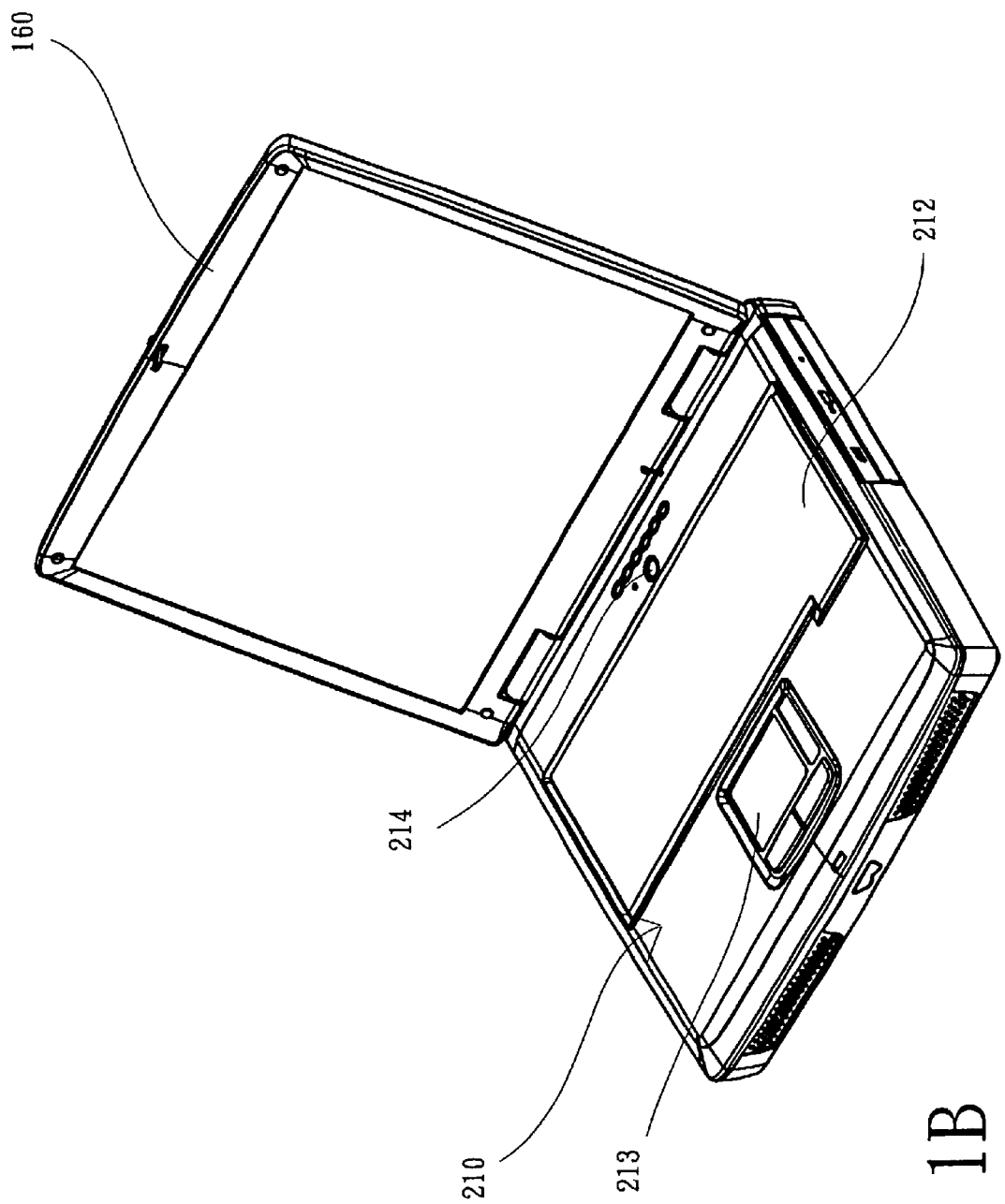
Figure 1C:
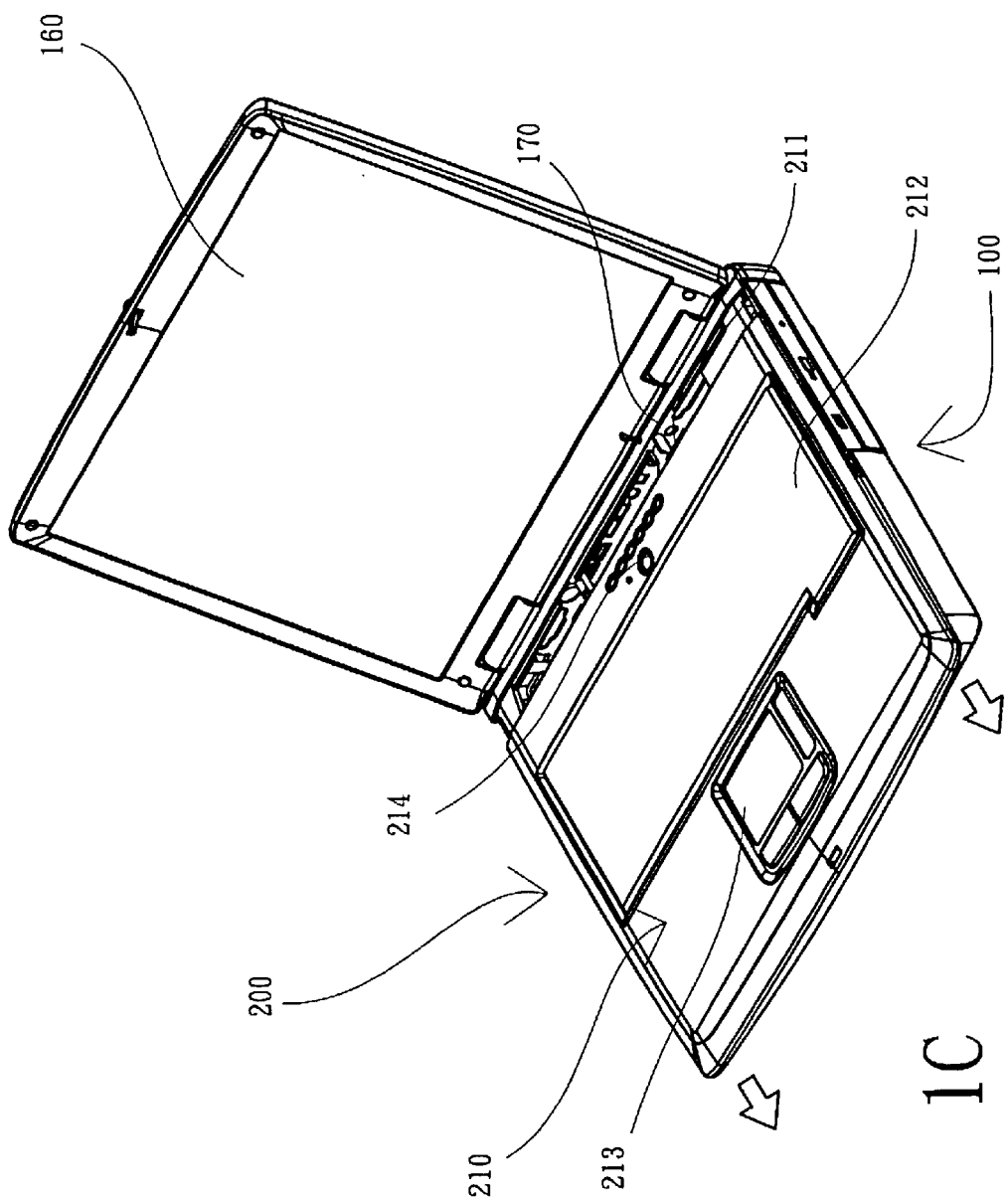
Figure 1D:
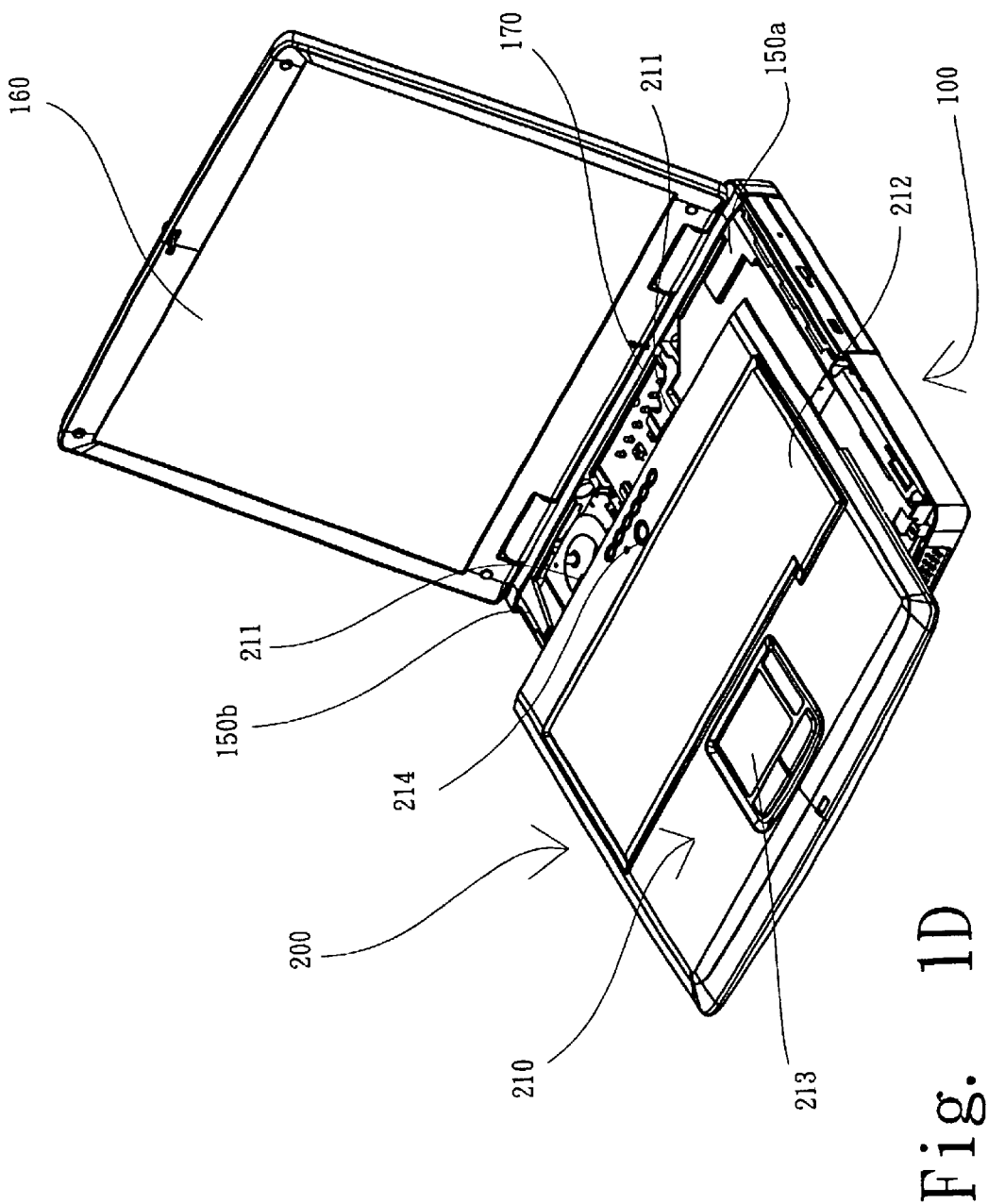
Figure 1E:
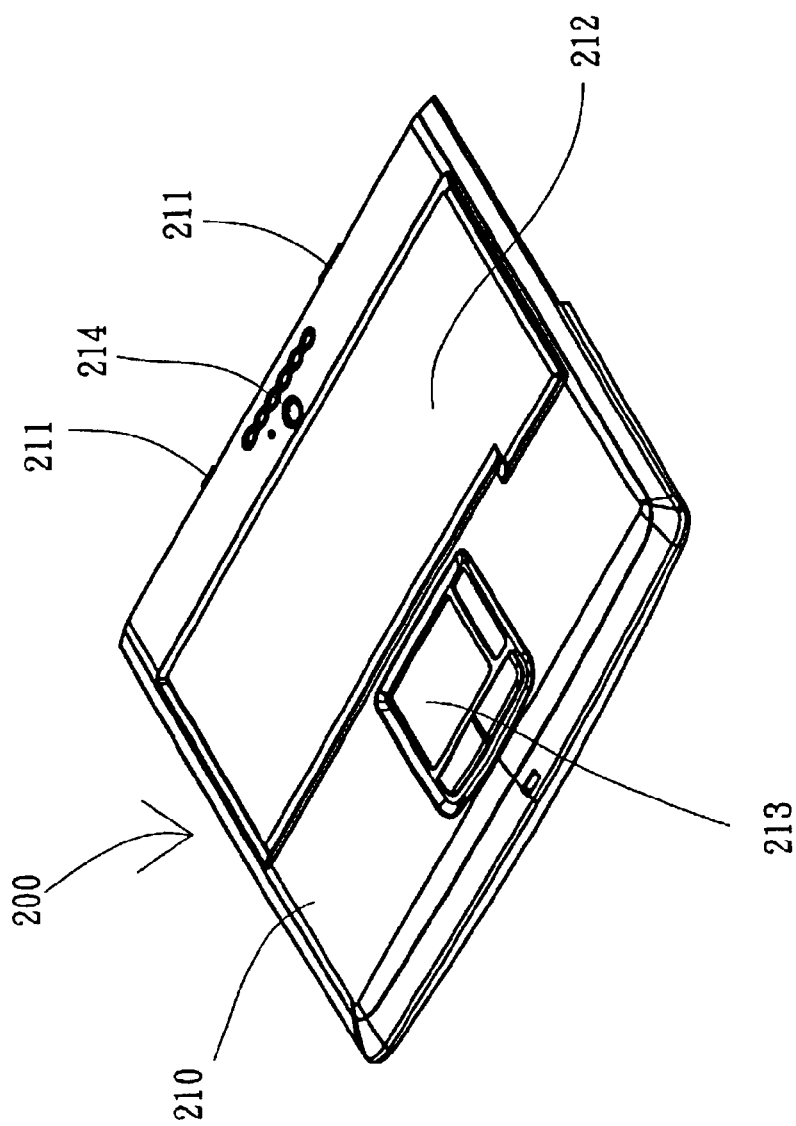
Figure 1F:
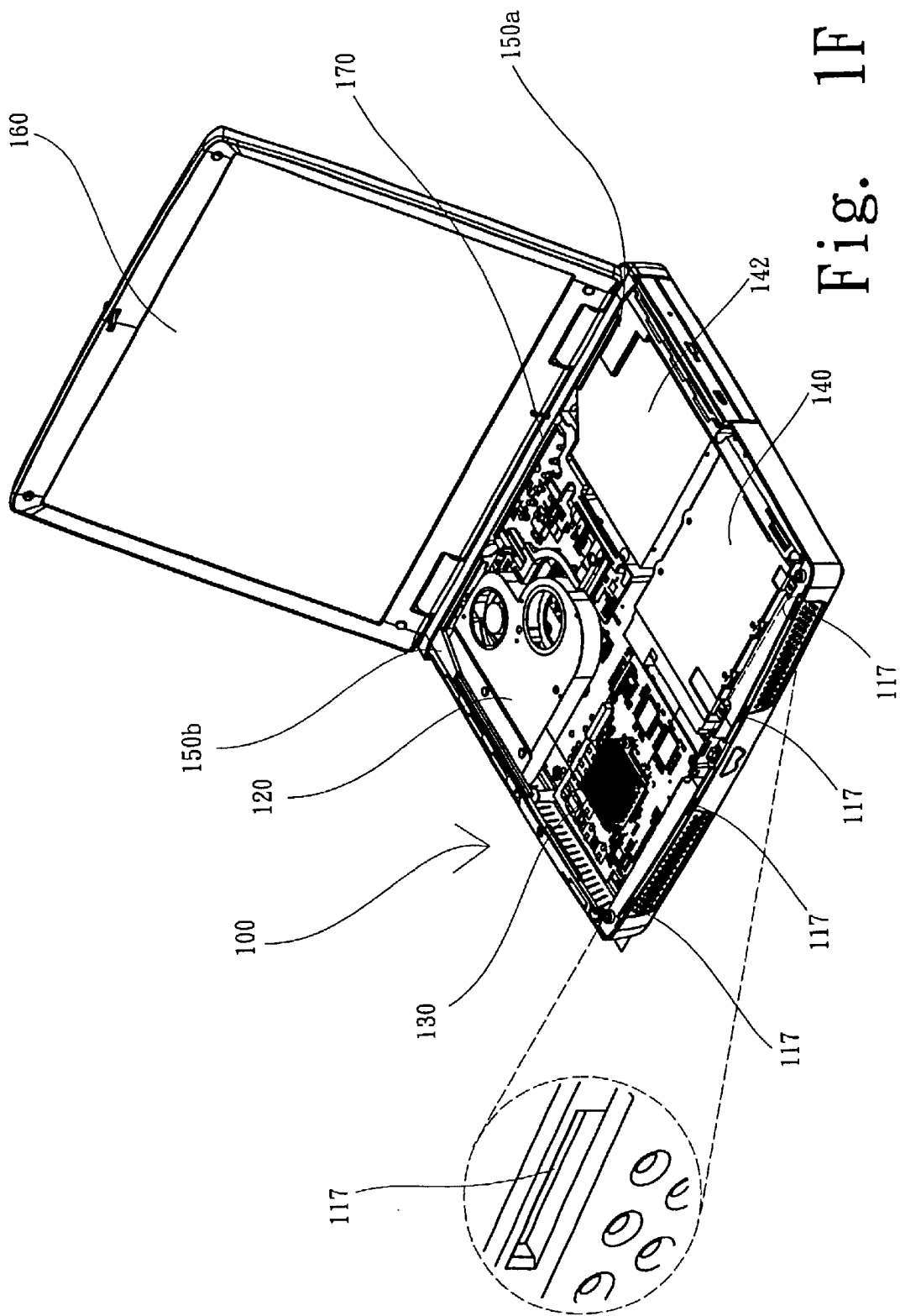

The present invention discloses a slidable cover mechanism for a notebook computer's main unit, wherein the cover can be separated from the main unit by the method of sliding. Referring to FIG. 1A to FIG. 1F, FIG. 1A to FIG. 1F are schematic diagrams showing the steps of separating a slidable cover mechanism for a notebook computer's main unit, according to the present invention. At first, such as shown in FIG. 1A, housing fixing elements 312 are loosened and removed from fixing holes 112 in the bottom of a bottom case portion 100 of the main unit. Thereafter, such as shown in FIG. 1B, the notebook computer is turned over, and then the display module 160 is opened so as to expose a top housing 210, in which there are a keyboard module 212, a touch-pad module 213 and an indicator module 214, etc. Then, such as shown in FIG. 1C, protrusion elements 211 of the top housing 210 are released from a bottom housing 170 of the bottom case portion 100 of the main unit, and tenons (not shown) at the bottom of the top housing 210 are released from grooves 117 (shown in FIG. 1F) of the bottom case portion 100 of the main unit. Thereafter, the cover 200 of the main unit can be drawn out of hinge support elements 150a and 150b (shown in FIG. 1D), wherein the hinge support elements 150a and 150b are installed on both sides of the bottom case portion 100 of the main unit, and are connected to a display module 160. Then, such as shown in FIG. 1D, FIG. 1E and FIG. 1F, the cover 200 can be completely separated from the bottom case portion 100, so that users may replace, maintain or upgrade various important components, such as a thermal module 120, a VGA card 130, a hard disk drive 140 or a CR-ROM drive 142, etc.

The detailed description regarding the cover mechanism of the main unit is explained as follows:

Referring to FIG. 1A, FIG. 1E, FIG. 1F and FIG. 2A to FIG. 2C, FIG. 2A, FIG. 2B and FIG. 2C respectively show, a schematic top view, a schematic bottom view and a schematic side view of the slidable cover mechanism for the notebook computer's main unit according to the present invention. The cover mechanism of the present invention comprises the top housing 210 (shown in FIG. 2A), a cover plate component 300 (shown in FIG. 2B) and a plurality of housing fixing elements 312 (shown in FIG. 1A), wherein the top housing 210 has a plurality of fixing holes 220, whereby the housing fixing elements 312 (such as screws) can be used to combine the bottom case portion 100 (shown in FIG. 1A) of the main unit with the top housing 210 via the fixing holes 220 and the fixing holes 112 (shown in FIG. 1A) at the bottom of the bottom case portion 100.

Two sliding hooks 215a and 215b are located on both sides of the top housing 210 for respectively engaging with two hinge support elements 150a and 150b (shown in FIG. 1F). Clipping hooks 216a and 216b are located below the sliding hooks 215a and 215b, and are also used for engaging with the two hinge support elements 150a and 150b. A plurality of tenons 217 are located on one side adjacent to the clipping hooks 216a and 216b for insetting in a plurality of grooves 117 (shown in FIG. 1F). Further, on one side adjacent to the display module 160 (shown in FIG. 1F), the top housing 210 has a plurality of protrusion elements 211 used for extending into the bottom housing 170 (shown in FIG. 1F) of the bottom case portion 100 of the main unit.

Figure 3B:
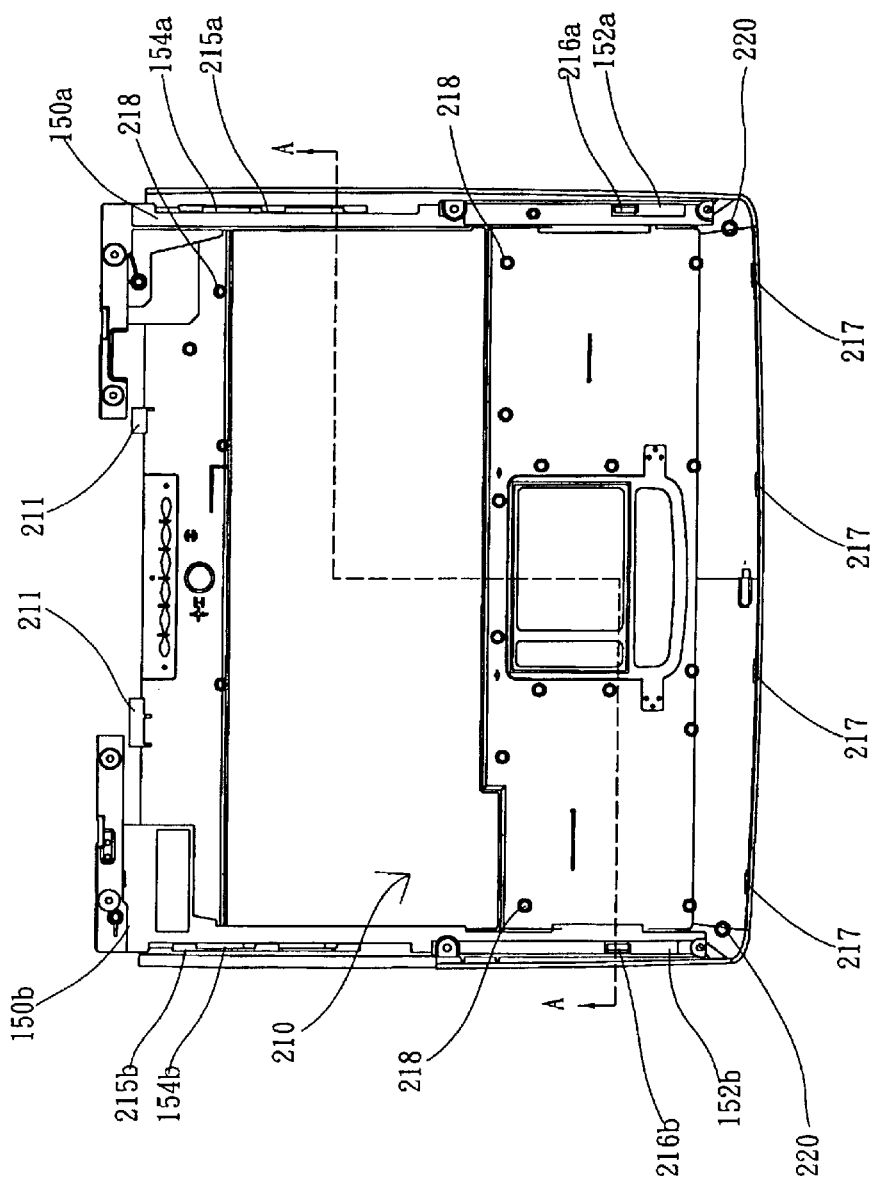
FIG. 3B is a schematic bottom view showing the relationship between the top housing and the hinge support elements, according to the present invention, wherein the top housing and the hinge support elements are engaged.
Figure 3C:
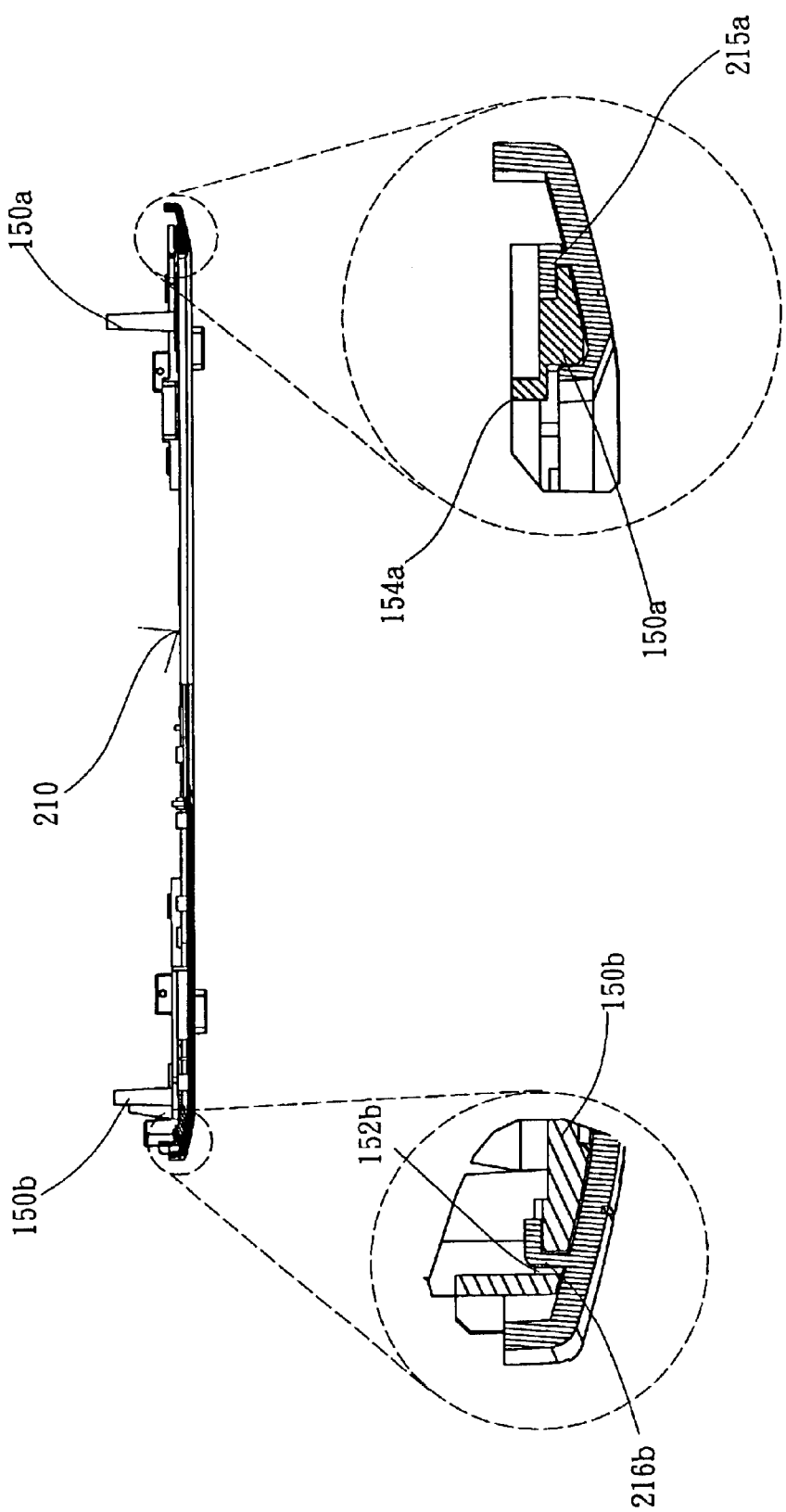
FIG. 3C is a schematic cross-sectional view shown from the direction of A—A line in FIG. 3B.
Figure 3D:
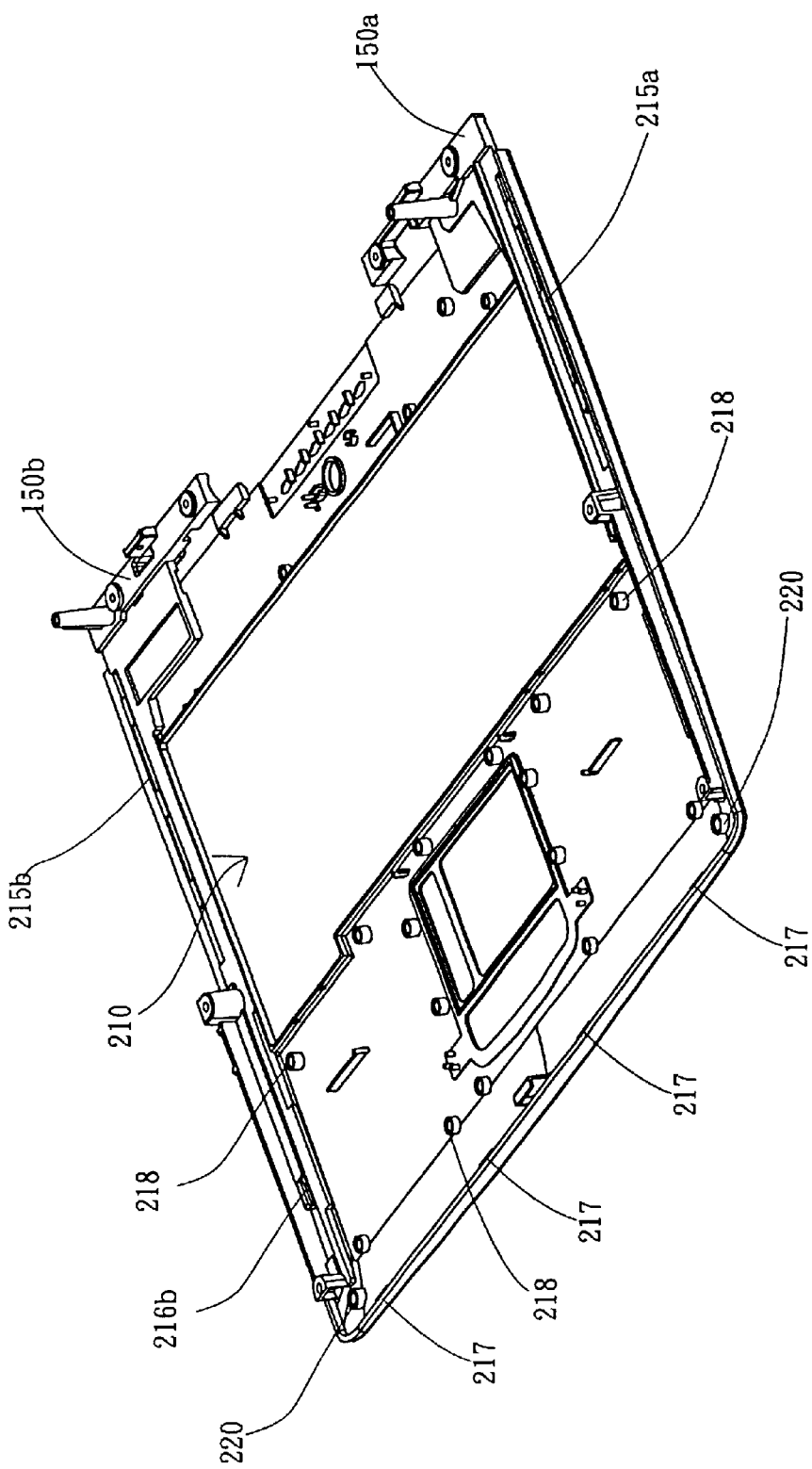
FIG. 3D is a schematic perspective view showing the relationship between the top housing and the hinge support elements, according to the present invention, wherein the top housing and the hinge support elements are engaged.

Referring to FIG. 3A and FIG. 3D, FIG. 3A and FIG. 3B are schematic bottom views showing the relationship between the top housing and the hinge support elements, according to the present invention, wherein the top housing and the hinge support elements are separated in FIG. 3A, and are engaged in FIG. 3B; FIG. 3C is a schematic cross-sectional view shown from the direction of A—A line in FIG. 3B; and FIG. 3D is a schematic perspective view showing the relationship between the top housing and the hinge support elements, according to the present invention, wherein the top housing and the hinge support elements are engaged.

Figure 2B:
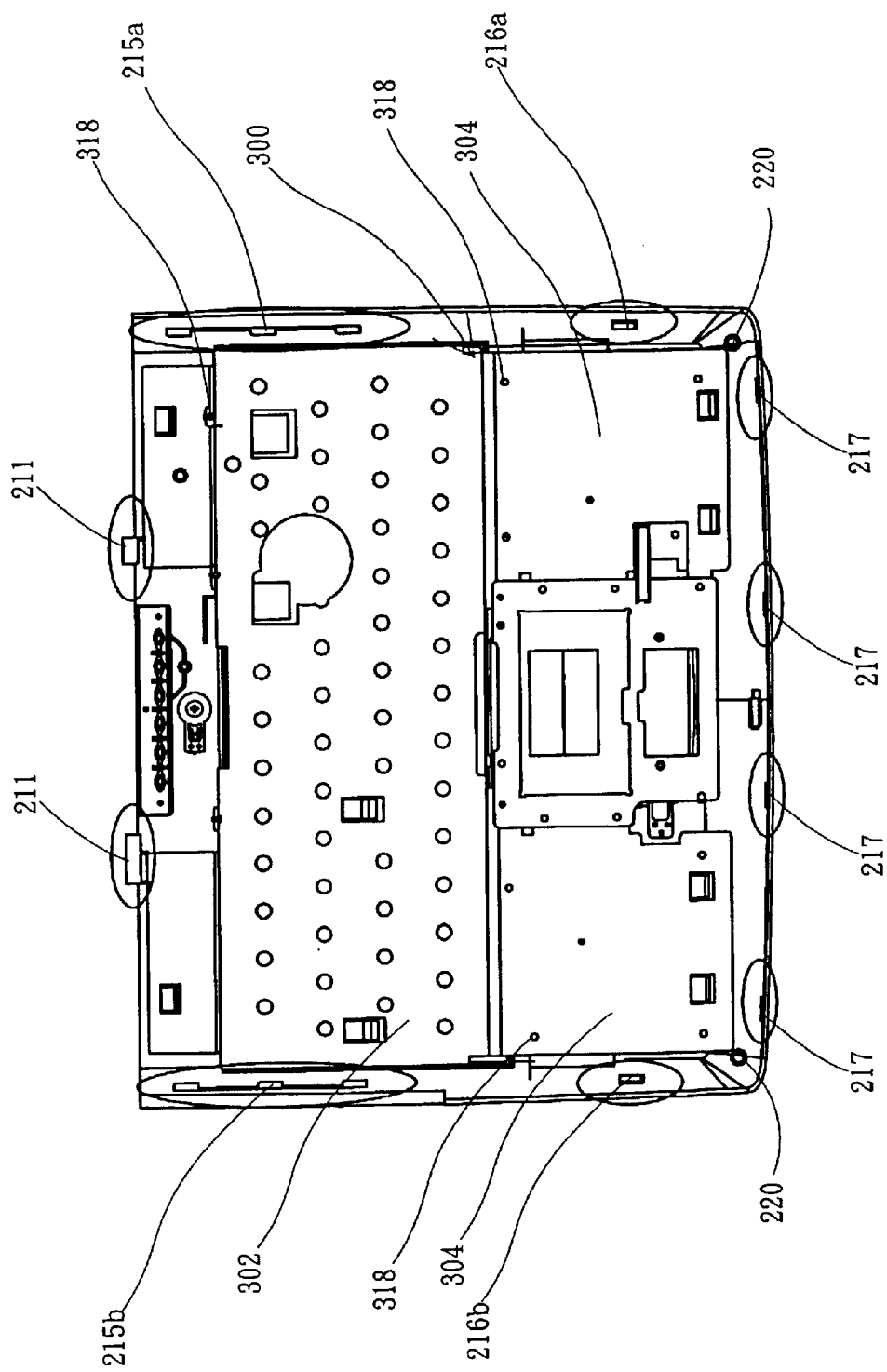
FIG. 2B is a schematic bottom view of the slidable cover mechanism for the notebook computer's main unit, according to the present invention.
Figure 2C:
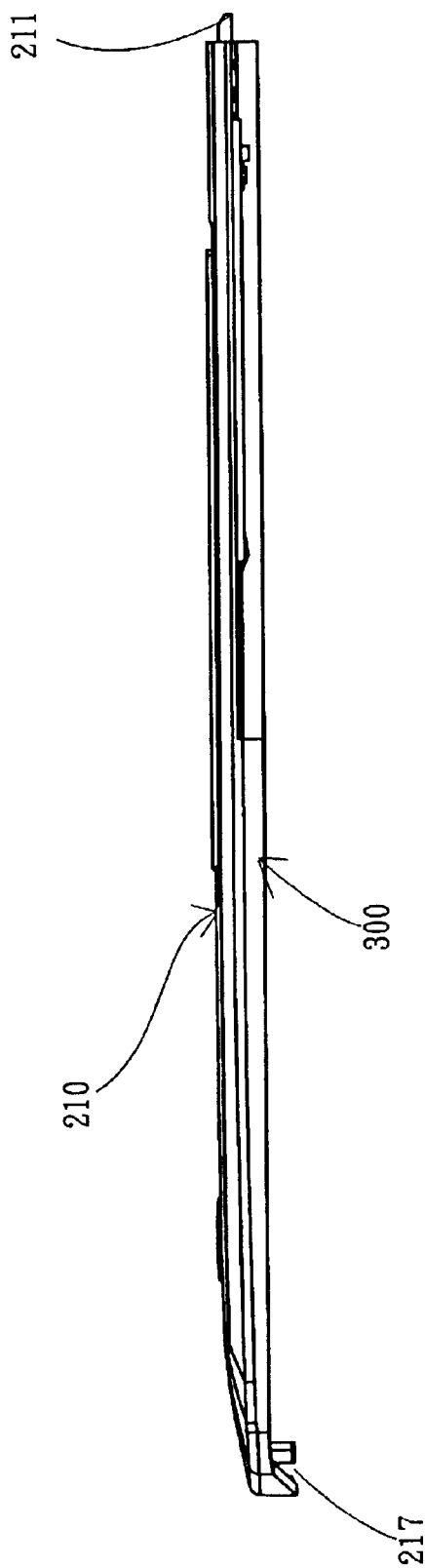
FIG. 2C is a schematic side view of the slidable cover mechanism for the notebook computer's main unit, according to the present invention.

The top housing 210 has a plurality of fastening holes 218, and such as shown in FIG. 2B, the cover plate component 300 comprises a keyboard plate member 302 and a touch-pad plate member 304, wherein a plurality of fastening holes 318 corresponding to the fastening holes 218 are located thereon. Hence, via the fastening holes 218 and the fastening holes 318, a plurality of cover fixing elements (not shown) are used for respectively combining the keyboard plate member 302 and the touch-pad plate member 304 with the top housing 210. A plurality of components can be installed between the top housing 210 and the cover plate component 300, and exposed through the top housing 210. Such as shown in FIG. 2A, those components can be for example, a keyboard module 212 installed between the keyboard plate member 302 and the top housing 210; a touch-pad module 213 installed between the touch-pad plate member 304 and the top housing 210; and an indicator module 214, etc.

Such as shown in FIG. 3A, when the top housing 210 and the hinge support elements 150a and 150b are separated, the clipping hooks 216a and 216b of the top housing 210 can move freely in the openings 152a and 152b respectively, and sliding plates 154a and 154b can also move freely in the sliding hooks 215a and 215b of the top housing 210 respectively. When the top housing 210 slides towards the hinge support elements 150a and 150b via the sliding hooks 215a and 215b, and the sliding plates 154a and 154b, until the clipping hooks 216a and 216b are engaged respectively with the sides of the openings 152a and 152b (shown in FIG. 3C), the top housing 210 is engaged with the hinge support elements 150a and 150b (shown in FIG. 3B and FIG. 3D). After the tenons 217 are inset in a plurality of grooves 117 (shown in FIG. 1F) of the bottom case portion 100 of the main unit, the top housing 210 is firmly fixed on the bottom case portion 100 of the main unit. While removing the cover of the main unit, since the clipping hooks 216a and 216b are made of elastic material, the clipping hooks 216a and 216b can be pushed away from the sides of the openings 152a and 152b, after the tenons 217 are released from the grooves 117. Thereafter, the sliding hooks are slid away from the sliding plates 154a and 154b, so as to briefly separate the top housing 210 and complete the dismantling the cover of the main unit.

Figure 4A:
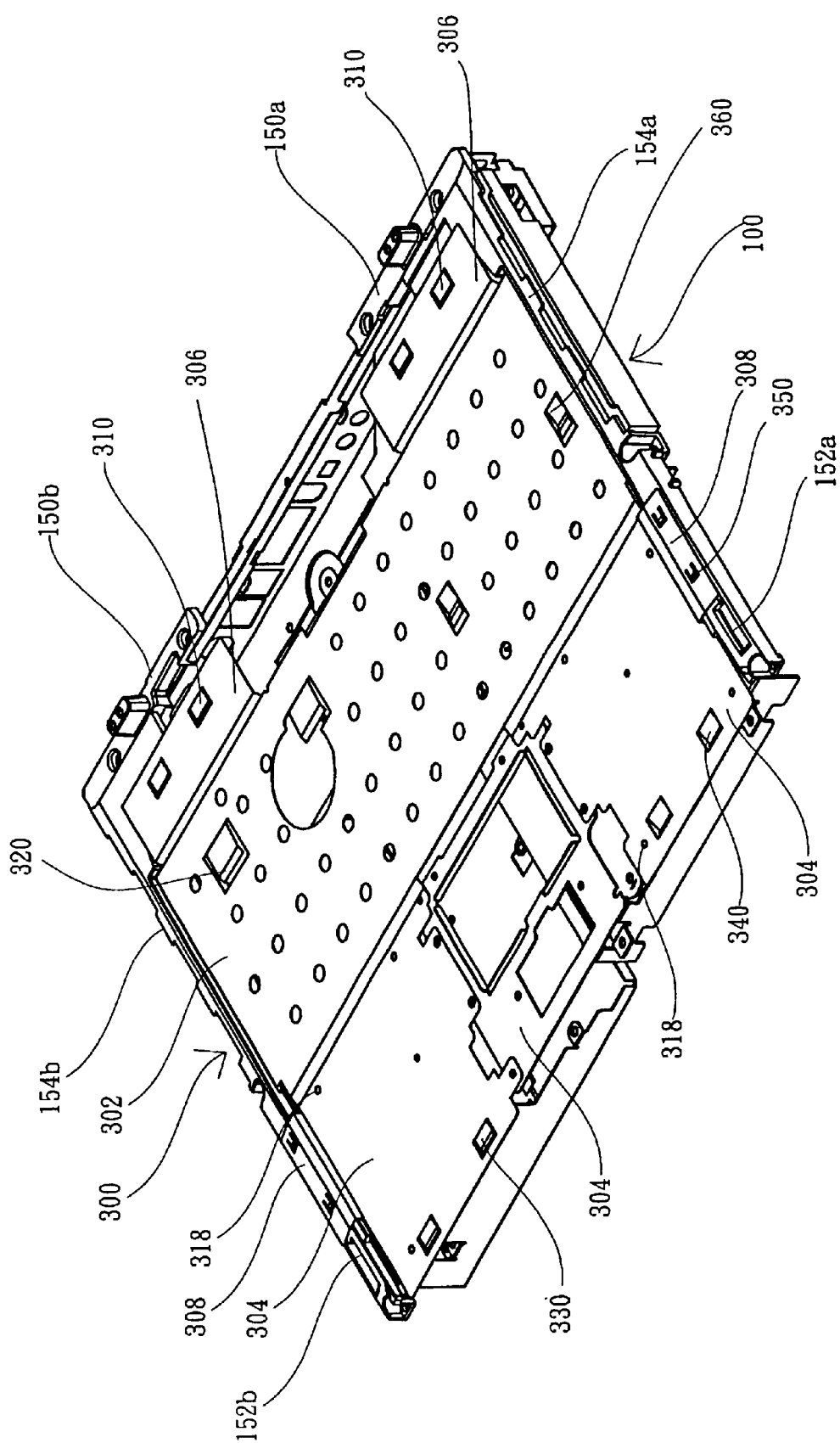
Figure 4B:
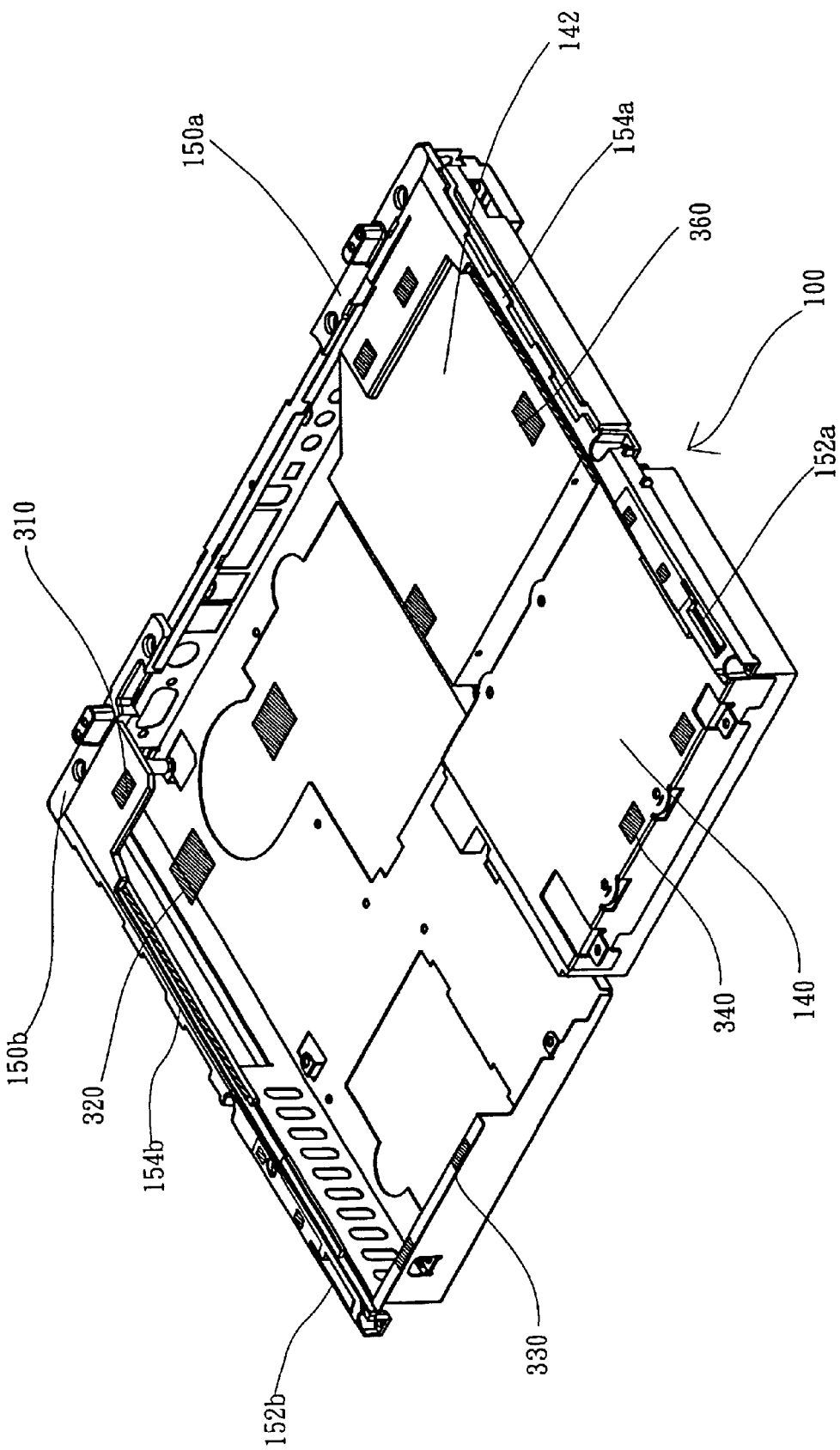

On the other hand, referring to FIG. 4A and FIG. 4B, FIG. 4A and FIG. 4B are schematic diagrams showing the locations of the contact points between the cover plate component and other components in the bottom case portion, according to the present invention, wherein FIG. 4B illustrates the bottom case portion of the main unit after the cover plate component is removed. The keyboard plate member 302 are connected to a plurality of plate elements 306, and the touch-pad plate member 304 are connected to a plurality of plate elements 308, wherein the plate elements 306 and 308 are riveted to the cover plate component 300. The plate elements 306 and 308 contact the hinge support elements 150a and 150b to form a plurality of hinge support element contacts 310 and 350, and the touch-pad plate member 304 contacts a bottom base of the bottom case portion 100 of the main unit to form a plurality of bottom base contacts 330, and the keyboard plate member 302 contacts a keyboard module to form a plurality of keyboard contacts 320, and the keyboard plate member 302 contacts a hard disk drive to form a plurality of hard disk contacts 340, and the keyboard plate member 302 contacts a CD-ROM drive to form a plurality of CD-ROM contacts 360, and so on. The aforementioned contacts form excellent EMI shielding areas for reducing EMI.

Hence, it is a main advantage of the present invention to provide a slidable cover mechanism for a notebook computer's main unit. The present invention can let the whole cover of the notebook computer completely drawn out of the main unit, thereby enabling a user to finish assembling and dismantling a notebook computer.

It is another advantage of the present invention to provide a slidable cover mechanism for a notebook computer's main unit. The cover mechanism of the present invention can form excellent EMI shielding areas.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A slidable cover mechanism for a main unit, used for a notebook computer comprising a display module and a bottom case portion of said main unit, wherein said slidable cover is combined with said bottom case portion, said bottom case portion having a plurality of grooves and a plurality of hinge support elements, said cover mechanism comprising:

a housing;

a plurality of sliding hooks, located on both sides of said housing for respectively engaging with said plurality of hinge support elements, wherein said plurality of hinge support elements are connected to said display module;

a plurality of clipping hooks, located on one side adjacent to said plurality of sliding hooks for respectively engaging with openings of said plurality of hinge support elements; and a plurality of tenons, located on one side adjacent to said plurality of clipping hooks of said housing for insetting in said plurality of grooves of said bottom case portion.

2. The slidable cover mechanism of claim 1, wherein a plurality of cover components are installed on said housing, and are exposed through said housing.

3. The slidable cover mechanism of claim 2, wherein said plurality of cover components comprises:

a keyboard module;

a touch-pad module; and an indicator module.

4. The slidable cover mechanism of claim 3, further comprising a cover plate component located between said housing and said bottom case portion.

5. The slidable cover mechanism of claim 4, wherein said cover plate component comprises: a keyboard plate member and a touch-pad plate member, wherein said keyboard module is installed between said keyboard plate member and said housing, and said touch-pad module is installed between said touch-pad plate member and said housing.

6. The slidable cover mechanism of claim 4, further comprising a plurality of cover fixing elements used for combining said cover plate component with said housing.

7. The slidable cover mechanism of claim 4, further comprising a plurality of hosing fixing elements, wherein said plurality of housing fixing elements are used for combining said bottom case portion with said housing.

8. The slidable cover mechanism of claim 1, wherein said plurality of clipping hooks are made of elastic material.

9. The slidable cover mechanism of claim 7, wherein said plurality of housing fixing elements are a plurality of screws.

10. A slidable cover mechanism for a main unit, used for a notebook computer comprising a display module and a bottom case portion of said main unit, wherein said slidable cover is combined with said bottom case portion, said bottom case portion having a plurality of grooves and a plurality of first fixing parts, said cover mechanism comprising:

a housing;

a plurality of second fixing parts;

two sliding hooks, located on both sides of said housing for respectively engaging with two hinge support elements, wherein said hinge support elements are installed on said bottom case portion, and are connected to said display module;

two clipping hooks, located on one side adjacent to said sliding hooks for respectively engaging with two openings of said hinge support elements;

a plurality of tenons, located on one side adjacent to said clipping hooks of said housing for insetting in said plurality of grooves of said bottom case portion;

a plurality of first fastening parts; and a plurality of protrusion elements, located on one side adjacent to said display module for extending into said bottom case portion;

a cover plate component, located between said housing and said bottom case portion, wherein said cover plate component has a plurality of second fastening parts, whereby said cover plate component can be combined with said housing by using a plurality of cover fixing elements via said plurality of first fastening parts and said plurality of second fastening parts; and a plurality of housing fixing elements, wherein said plurality of housing fixing elements are used for combining said bottom case portion with said housing via said plurality of first fixing parts and said plurality of second fixing parts.

11. The slidable cover mechanism of claim 10, wherein a plurality of cover components are installed on said housing, and are exposed through said housing.

12. The slidable cover mechanism of claim 11, wherein said plurality of cover components comprises:

a keyboard module;

a touch-pad module; and an indicator module.

13. The slidable cover mechanism of claim 12, wherein said cover plate component comprises: a keyboard plate member and a touch-pad plate member, wherein said keyboard module is installed between said keyboard plate member and said housing, and said touch-pad module is installed between said touch-pad plate member and said housing.

14. The slidable cover mechanism of claim 13, wherein said cover plate component further has a plurality of contacts respectively contacting a bottom base of said bottom case portion, said hinge support elements, said keyboard module and a plurality of bottom case components, thereby forming EMI (Electromagnetic Interference) shielding areas.

15. The slidable cover mechanism of claim 14, wherein said plurality of bottom case components comprises:
- a hard disk drive, which is located in said bottom case portion, and contacts said touch-pad plate member; and
- a CD-ROM drive, located in said bottom case portion, and contacts said keyboard plate member.

16. The slidable cover mechanism of claim 14, wherein said bottom base contacts said keyboard plate member, and said hinge support elements contacts a plurality of plate elements respectively connected to said keyboard plate member and said touch-pad plate member.

17. The slidable cover mechanism of claim 10, wherein said clipping hooks are made of elastic material.

18. The slidable cover mechanism of claim 10, wherein said plurality of housing fixing elements are a plurality of screws.

* * * * *